UNITED STATES PATENT OFFICE.

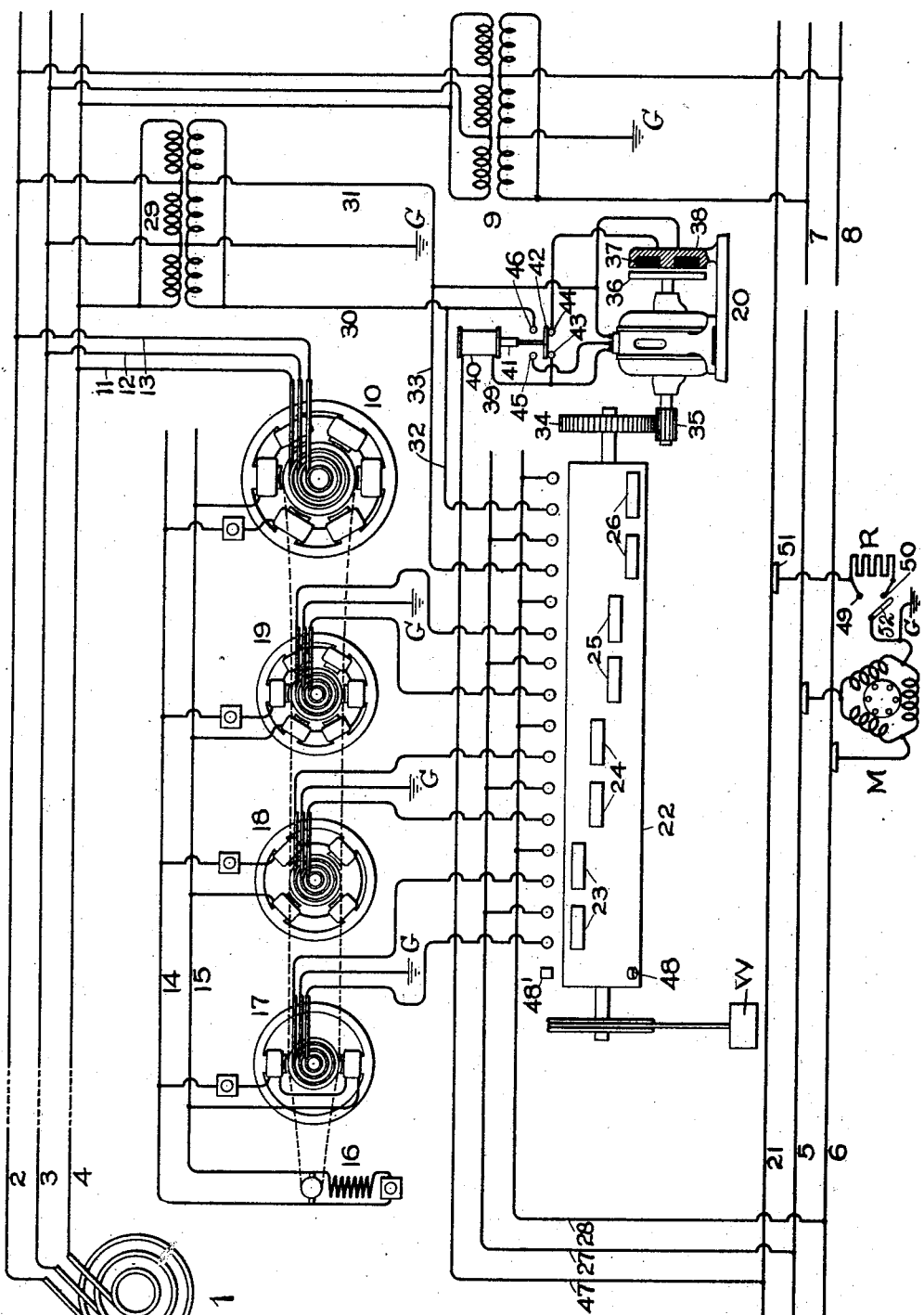

WILLIAM B. POTTER, OF SCHENECTADY, NEW YORK, ASSIGNOR TO THE GENERAL ELECTRIC COMPANY, A CORPORATION OF NEW YORK.

ELECTRIC RAILWAY.

SPECIFICATION forming part of Letters Patent No. 716,101, dated December 16, 1902.

Application filed April 28, 1900. Serial No. 14,660. (No model.)

*To all whom it may concern:*

Be it known that I, WILLIAM B. POTTER, a citizen of the United States, residing at Schenectady, in the county of Schenectady and State of New York, have invented certain new and useful Improvements in Electric Railways, (Case No. 1,641,) of which the following is a description.

My present invention relates to an electric-railway system, and in some of its aspects more particularly to that type which makes use of alternating current for its motive power.

It comprises certain means whereby an operator on a car may cause the working conductors constituting the conducting system through which current is fed to a motor or motors to be supplied with current from any one of a number of sources, whereby the motor or motors on the car may be caused to run at suitable speeds or to start from or come to rest through suitable gradations in speed.

Other advantages flowing from the use of my invention will be apparent by reference to the following description, taken in connection with the accompanying drawings, while the scope of the invention, both in its broad and narrow features, will be particularly pointed out in the appended claims.

In organizing an electric railway to operate in accordance with my invention I prefer in cases where the railroad is of considerable length to divide the working conductors up into sections. Some of these sections, such as those corresponding to portions of the road where no stops are to be made, are supplied by alternating current at a certain frequency, while other sections corresponding to portions of the road along which stops are to be made are arranged to be supplied with currents of a frequency controllable at the will of the operator on the car. For purposes of economy as well as convenience I find it preferable to supply the railroad as a whole by means of energy derived from a single central station and to obtain alternating currents of different frequencies by suitably transforming the current derived from the main source. It will of course be understood that my preference in this respect is not to be construed as a limitation, since it will be evident that separate sources of electrical energy may be employed, if desired, one of the sources being connected to one or more of the sections of the conducting system and other sources similarly connected.

The means which I employ for controlling the frequency of current supplied to the working conductors will be better comprehended by describing the same in connection with the accompanying drawings, which illustrate diagrammatically one embodiment of my invention.

At 1 I have indicated a source of electrical energy—such, for example, as a three-phase alternating-current generator, the particular nature of the generating means being unimportant. Transmission-lines 2, 3, and 4 extend therefrom and along the line of the railway. The breaks in the transmission-lines 2, 3, and 4 are intended to indicate a transmission-line of considerable length, a portion of the same being shown in the drawings. The working conductors from which current is collected and supplied to the motors on the railway-vehicles are indicated at 5 and 6. These conductors 5 and 6 constitute a single section, an adjacent section being shown at 7 8. The section 5 6 is supposed to represent a portion of the conducting system located near a station or other stopping-place, while the section 7 8 corresponds, on the other hand, to a portion of the road on which no stops are normally made.

When the railway-vehicles are on portions of the line between stations—such, for example, as those corresponding to the conductors 7 8—they are supposed to operate at full speed. The conductors 7 8 may therefore be supplied with current of normal and invariable frequency, and to this end suitable connections are made between the transmission-lines 2 3 4 and the conductors 7 8. As illustrative of such connections, I have shown a step-down transformer 9, with primary and secondary leads connected, respectively, to the transmission-lines 2, 3, and 4 and to the working conductors 7 and 8, one terminal of the secondary being grounded to correspond with the ground connection of the motors representing the return-circuit for the three-phase current utilized by the motor.

The section comprising the conductors 5 6, unlike the section comprising the conductors 7 8, is arranged to be supplied with currents of different frequencies, the particular means employed being shown in the drawings partly in diagram and partly by pictorial representation. The alternating currents of different frequencies may be separately generated or produced in a great many other ways; but for the present purpose I propose to use a generating means consisting of a motor supplied with current from the transmission-lines 2, 3, and 4 and mechanically connected to a number of generators in such a way as to secure suitable gradations of frequency in the currents produced by said generators. In the drawings I have indicated the motor at 10 and its connections with the transmission-lines 2, 3, and 4 by means of the conductors 11, 12, and 13, these conductors being led into the armature of the motor in a well-understood manner. The motor which I prefer to employ is of the synchronous type, having its field excited by direct current, the direct current in this instance being supplied over bus-bars 14 15, fed from a small exciter 16, which, if desired, may be driven by the said motor. A number of generators 17 18 19 are mechanically connected in any suitable manner to the driving-motor 10, the arrangements being such that the currents produced by the respective generators vary in frequency. These generators may be directly connected together and with the driving-motor, so that the shafts of all the machines constitute practially a single shaft, in which case the generators 17, 18, and 19 require in their construction different numbers of poles, so as to produce currents of different frequencies. On the other hand, a belted or geared connection between the generators and the driving-motors may be made in such a manner as to cause the generators to run at different speeds, in which case the generators need not necessarily have different numbers of poles. In the drawings dotted lines are intended to represent suitable mechanical connections between the machines. From what has been said it will be evident that many different devices and adaptations may be employed for producing the alternating currents of the frequency desired without departing from my invention.

To make suitable connections between the generators of different frequency and the section of the supply system comprising the working conductors 5 6 of the railway, I make use of a switch the movement of which is controlled from an electric circuit which may be opened and closed on the railway-vehicle as it moves along. In the instance shown the switch is driven by a small induction-motor 20, the circuits of which are opened and closed by a relay device connected to a controlling-conductor 21, extending along the line of the railway parallel to the working conductors and with which a sliding contact is made by means of a contact-shoe carried by the car.

One form of switching device which I find appropriate for carrying out my invention consists of a cylinder mounted in suitable bearings, so as to revolve about its axis, and having thereon a series of angularly and progressively displaced contacts adapted to successively engage a plurality of coöperating fixed contact-fingers. In the drawings the switch-cylinder is shown at 22 and is indicated as provided with four sets of contacts, (numbered 23, 24, 25, and 26, respectively.) The row of fixed contact-fingers is indicated by the line of small circles shown just above the cylinder 22. Corresponding with the sets of contacts 23 to 26, inclusive, there are for each set a pair of contact-fingers connected, respectively, to leads 27 28, joined to the working conductors 5 6. The other contact-fingers are connected to sources of alternating current of different frequencies and by the rotation of the cylinder 22 act through the intervention of the leads 27 28 to connect the working conductors 5 6 with the different sources of alternating current.

In the system shown one of the three-phase leads is grounded in all cases, so as to form a return conductor, so that in making connections only two leads have to be considered. Thus, for example, in the case of the generator 17 one of its leads is grounded at G, while the other two lead to contact-fingers on the controlling-switch. In a similar way one of the leads of each of the generators 18 19 is grounded, while the other terminals are connected to suitably-arranged contact-fingers on the controlling-switch. Current of normal frequency is derived from the secondary of a transformer 29, the primary of which is connected across the transmission-lines 2, 3, and 4 and the secondary to leads 30 and 31, one of the secondary terminals being, however, grounded at G, as before mentioned. Branch conductors 32 and 33 lead to contact-fingers on the controlling-switch.

By an inspection of the diagram it will readily be seen that as the controlling-switch is turned the fixed contacts 23 are first to engage their coöperating contact-fingers, thereby connecting the generator 17 which is of the lowest frequency with the leads 27 28, which are joined to the working conductors 5 6, thereby supplying the working conductors with current of minimum frequency. As the controlling-switch continues its movement the generator 17 is cut out of circuit and the generator 18 substituted therefor, while upon still further movement the generator 18 is cut out and that numbered 19 substituted. Upon completion of the movement of the controlling-switch the generator 19 is cut out of circuit and the working conductors connected across the secondary of the transformer 29, thereby receiving current of the same frequency as that flowing in the transmission-lines 2, 3, and 4. It is to be understood that the currents derived from the generators 17, 18, and 19 vary in frequency, as well as in voltage, in such a progression as to give the desired rate of acceleration to the railway-vehicles as the controlling-switch is turned by means of its driving-motor.

The driving-motor (shown at 20) is mechanically connected with the switch-cylinder 22 by means of a toothed gear 34 and a pinion 35, though it is to be understood that any suitable connection may be employed in place thereof. This motor I prefer to make of the three-phase type, so that it may be supplied directly from the three-phase circuits of the railway system. In order to lock the armature of the motor in any desired position, I make use of some suitable form of clutch, that one which is shown in the drawings being of the magnetically-actuated type. The armature of the motor is provided with a disk 36, of magnetic material, mounted on the end thereof. In close proximity thereto is the core of an electromagnet 38, carried by a standard fixed to the base-plate of the motor. This magnet is shown as consisting of a flat plate having a working face arranged close to the coöperating disk 36. A magnetizing-coil 37 is embedded in the core of the electromagnet. To secure positive action, the working faces of the clutch may be toothed, if desired.

The circuits of the motor 20 and of the electromagnetic clutch 37 are directly controlled by means of a relay device 39, which in its turn is brought into operation when the operator on the car grounds the controlling-conductor 21 in a suitable manner.

The relay device consists of a solenoid 40, operating upon a core 41, to which a suitable circuit-closing device is attached. In the arrangement shown the circuit-closing device consists of a plate 42, which in one position connects the fixed contacts 43 and 44, while in its other position it connects the fixed contacts 45 and 46. The relay device is vertically arranged, so that the action of gravity retains the contact-plate 42 in position to connect the fixed contacts 43 and 44 when there is no current in the solenoid 40 or insufficient current to lift its core and attached parts. When, on the other hand, sufficient current flows through the circuit, the action of gravity is overcome, and the plate 42 connects the fixed contacts 45 and 46, the plate being returned to its original position when the current in the solenoid is sufficiently reduced or is interrupted.

The connections of the motor-terminals are as follows: One of the terminals is connected to one of the lower fixed contacts 43, another to a fixed contact 45 immediately above, while the third is not connected to any of these fixed contacts, but directly to the secondary main 31 of the supply-transformer 29. The magnetizing-coil 37 of the magnetic clutch has one of its terminals connected to one of the lower fixed contacts 44, while its other terminal is joined to the main 31. The actuating-circuit 40 of the relay device 39 has one terminal connected to the fixed contact 43, to which one of the terminals of the driving-motor is also connected, its other terminal being connected, through a suitable lead 47, with the controlling-conductor 21, arranged along the railway.

The motor 20 is arranged, as already described, so as to rotate the controlling-switch 22 in one direction, while in order to produce a reverse direction of rotation I employ some suitable means—such, for example, as a spring or weight. In the instance shown a weight W is employed, the same being suspended from a cord passing over a pulley on the shaft of the cylinder. A pin 48, carried by the cylinder of the switch, is adapted to engage a fixed elastic buffer 48', which serves as a stop to limit the motion of the switch-cylinder in either direction.

The controlling-circuit on the railway-vehicle consists of a resistance R, having two terminals connected, respectively, to fixed contacts 49 50, one terminal of the resistance R being also connected to a contact-shoe 51, arranged to slide along the controlling-conductor 21. A switch 52 is arranged so as to connect either of the fixed contacts 49 and 50 to ground, as shown at G.

In starting the motor (indicated at M) the operator first closes the switch upon the contact 50, thereby causing current to pass through the solenoid 40 and through the magnetizing-coil 37 on the magnetic clutch, the circuit being completed through the conductor 31 of the transformer 29 and the respective ground connections of said transformer. The resistance is so chosen that the solenoid 40 does not cause its core to be lifted, although at the same time the current through the magnetic clutch is sufficient to cause the same to be brought into action. This step in the operation is ineffective in starting, being of use only in subsequent operations. The switch 52 is therefore moved rapidly over the contact 50 and to contact 49, where it is allowed to remain until the vehicle has been brought up to normal speed, this operation taking place in the following manner: The resistance R being cut out, a stronger current flows through the solenoid 40, thereby causing the contact-plate 42 to be lifted and brought into engagement with the fixed contacts 45 and 46. By this operation one of the terminals of the motor is connected directly to ground through the lead 47, while the other two terminals are then in connection with the secondary mains 30 and 31 of the supply-transformer 29. The other main of the supply-transformer being also grounded completes the connections to the motor, and the same therefore starts up and runs, thereby causing a slow rotation of the controlling-switch 22. The working conductors 5 6 are then progressively connected with circuits of different frequencies until they are finally brought into connection with the mains of the supply-transformer 29 in a manner already described. After these connections have been effected the controlling-switch 52 is moved back to the contact 50, thereby causing the circuit of the motor 20 to be broken, at the same time completing the circuit through the magnetic clutch 38, whereupon the motor is stopped and locked in position. When it is desired to stop the railway-vehicle by progressively decreasing the frequency of current supplied to the working conductors 5 and 6, all that is necessary is to move the switch 52 off the contact 50, so as to break the controlling-circuit. The magnetic clutch is then released, and the weight W or other energy-storing device causes a reverse movement of the switch-cylinder, thereby producing an inversely-progressing change in the frequency of current supplied to the working conductors until finally the current has been interrupted altogether.

Various important advantages accrue from the use of a system operating in the manner above described. Thus, for example, when the frequency of current in the supply system is progressively increased in order to start the motor or motors connected thereto the result, so far as starting torque is concerned, is practically the same in effect as that secured by the use of a variable resistance in the secondary of the motor, without, however, involving the waste of energy incident thereto. There is this difference, however, that with a low frequency, although the starting torque may be made equal to or greater than that at a higher frequency with resistance in the secondary of the motor, the maximum attainable speed of the motor at this low frequency is correspondingly low. To get an increase in speed, it is therefore necessary to increase the frequency, and in the arrangement above shown this increase is made progressive, so that the rate of acceleration may have some approximation to uniformity.

In stopping the motors fed from the working conductors the frequency-varying means presents valuable advantages in that it permits the motors to act as generators, thereby serving as powerful brakes, at the same time returning to the line the energy which would otherwise be lost in the brake-shoes. If the motor or motors be running at normal speed, then if the frequency of current in the working conductors be reduced by a suitable amount less than that corresponding to the speed of the motors the motors will act as induction-generators, since they will then be running at a speed above synchronism. The braking effect which results will then act, of course, to reduce the speed of the motors and the vehicle or vehicles driven thereby, so that the speed of the motors drops until the motors run below the value of speed corresponding to synchronism at the reduced frequency. At or about this time the frequency on the working conductors may be reduced another step, thus repeating the operation described, and this cycle of operations may be continued until the lowest frequency available is brought into use, whereupon the circuit may be interrupted altogether. These changes may be caused to take place at regularly-recurring intervals by allowing the switch-operating mechanism to act continuously, or the changes may be made step by step, with any desired interval between each step, by suitably manipulating the controlling-switch 52 on the car.

Since the section comprising the conductors 5 6 and similarly-operated sections are normally dead, the controlling-conductor 21 is extended along the adjacent sections, so that as a car approaches a normally dead section the operator on the car by closing the circuit of the controlling-conductor, as described, may bring the said section up to normal frequency prior to the time the car runs into that section. When such section is reached, the frequency of current supplied to conductors of that section may be reduced in the manner described.

It will be evident that my invention is susceptible of many modifications and adaptations, and for this reason I do not wish my claims to be construed in a limited sense, but rather to be extended so as adequately to protect my invention.

What I claim as new, and desire to secure by Letters Patent of the United States, is—

1. The combination of working conductors, an alternating-current motor, traveling current-collecting means connecting said working conductors and motor, and means controlled from the vicinity of the motor for varying the frequency of current supplied to said working conductors.

2. In an electric-railway system, the combination of a current-conducting system, a railway-vehicle, and means on said vehicle for controlling the frequency of current supplied to said current-conducting system.

3. The combination of a plurality of generators, a motor, and an electrically-controlled switch for connecting the supply-circuits of said motor with any one of said generators.

4. The combination of working conductors, an alternating-current motor, traveling current-collecting means for operatively connecting said working conductors and motor, and a switching mechanism controlled from the vicinity of said motor for varying the frequency of current supplied to said working conductors.

5. The combination of working conductors, a multiphase alternating-current motor, traveling current-collecting means for operatively connecting said working conductors and motor, and a switching mechanism controlled from the vicinity of said motor for varying the frequency of current supplied to said working conductors.

6. The combination of working conductors, an alternating-current motor, traveling current-collecting means for operatively connecting said working conductors and motor, and an electrically-controlled switching mechanism for controlling the frequency of current supplied to said working conductors.

7. In an electric-railway system, the combination of a current-conducting system extending along the railway, an electrically-driven vehicle adapted to receive energy from said current-conducting system, and means on said vehicle for controlling the frequency of current supplied to said current-conducting system.

8. In an alternating-current electric-railway system, the combination of a current-conducting system extending along the railway, an electrically-actuated vehicle on said railway, and means controlled from said vehicle for progressively increasing or decreasing the frequency of current supplied to said current-conducting system.

9. In an electric-railway system, the combination of a current-conducting system extending along the railway, means for generating currents of different frequencies, and an electrically-controlled switch for governing the supply of said currents to said current-conducting system.

10. In an electric-railway system, the combination of conductors extending along the railway, means for generating currents of different frequencies, and an electrically-driven switch for governing the supply of said currents to said conductors.

11. In an electric-railway system, the combination of supply-conductors extending along the railway, an electrically-actuated vehicle on said railway, a plurality of sources of current, and means controlled from said vehicle for connecting said supply-conductors with said sources of current.

12. In an electric-railway system, the combination of supply-conductors extending along the railway, an electrically-actuated vehicle on said railway, a source of current, and means controlled from said vehicle for connecting said source of current and said supply-conductors together.

13. The combination of a plurality of sources of current, a supply-circuit, a control-circuit, and means brought into action through the instrumentality of said control-circuit for connecting said supply-circuit with any one of said sources of current.

14. In an electric-railway system, the combination of sectional conductors arranged along the railway, means for supplying one section with current of uniform frequency, and means for supplying another section with currents of variable frequency.

15. In an electric-railway system, the combination of sectional conductors arranged along the railway, means for supplying one section with current of uniform frequency, and means for supplying another section with currents of frequency variable at will.

16. In an electric-railway system, the combination of sectional conductors arranged along the railway, a vehicle on said railway, and means controlled from said vehicle for supplying current of variable frequency to one of said sections.

17. In an electric-railway system, the combination of working conductors extending along the railway, a control-conductor also extending along the railway, an electrically-actuated vehicle, contacts moving with said vehicle and engaging said conductors, a switch on the vehicle for completing the circuit of said control-conductor, sources of current of different frequencies, and means responsive to the operation of said switch for connecting said working conductors with any one of said sources.

18. In an electric-railway system, the combination of a current-conducting system extending along the railway, a control-conductor also extending along the railway, an electrically-actuated vehicle, contacts moving with said vehicle and engaging said current-conducting system and said control-conductor, a switch on the vehicle for completing the circuit of said control-conductor, sources of current of different frequencies, and means responsive to the operation of said switch for progressively connecting said current-conducting system with the different sources of current.

19. In an electric-railway system, the combination of a current-conducting system extending along the railway, a control-conductor also extending along the railway, an electrically-actuated vehicle, contacts moving with the vehicle and engaging said current-conducting system and said control-conductor, means on said vehicle for completing the circuit of said control-conductor, a plurality of sources of current, and means brought into action through the instrumentality of the circuit of said control-conductor, for connecting said current-conducting system with any one of said sources.

20. In an electric-railway system, the combination of a current-conducting system extending along the railway, a control-conductor also extending along the railway, an electrically-actuated vehicle, contacts moving with the vehicle and engaging said current-conducting system and said control-conductor, means on the vehicle for completing the circuit of said control-conductor and for varying the current therein, a plurality of sources of current, and means brought into action through the instrumentality of the circuit of said control-conductor for connecting said current-conducting system with any one of said sources.

21. In an electric-railway system, the combination of a current-conducting system extending along the railway, a control-conductor also extending along the railway, an electrically-actuated vehicle, contacts moving with the vehicle and engaging said current-conducting system and said control-conductor, a rheostatic switch on the vehicle for completing the circuit of said control-conductor, a plurality of sources of current, and means brought into action through the instrumentality of the circuit of said control-conductor for connecting said current-conducting system with any one of said sources.

22. In an electric railway, a sectional conducting system, a source of alternating current of fixed frequency connected to certain of the sections of the conducting system, a plurality of sources of alternating current of different frequencies, and means for connecting any one of said plurality of sources to another section or sections.

23. In an electric railway, a sectional conducting system, a source of alternating current of fixed frequency connected to certain of the sections of the conducting system, a plurality of sources of alternating current of successively-increasing frequencies and means for successively connecting said sources to another section or sections of the conducting system.

24. In an electric railway, a sectional conducting system, a source of alternating current of fixed frequency connected to certain of the sections of the conducting system, means for supplying alternating currents of fixed frequency to certain of the sections of the conducting system, and means for supplying currents of successively-varying frequency to another section or sections.

25. In an electric railway, a sectional conducting system, a source of alternating current of fixed frequency connected to certain of the sections of the conducting system, a plurality of sources of alternating current of different frequencies, a switch for connecting any one of said plurality of sources to another of said sections, and means controllable from a distant point for operating said switch.

26. In an electric-railway system, a motor equipment, a sectional conducting system for supplying current thereto, a source of alternating current of fixed frequency connected to certain of the sections of the conducting system, means for supplying currents of successively-varying frequency to another section or sections, a device for determining the frequency to be supplied, electromagnetic means for controlling the operation of said device, and an operating system for said electromagnetic means comprising a suitable source of current, a conductor extending along the railway, a traveling contact coöperating therewith, and a switch in operative relation to said contact.

27. In an electric-railway system, a motor equipment, a sectional conducting system for supplying current thereto, a source of alternating current of fixed frequency connected to certain of the sections of the conducting system, and means located at certain points along the road for supplying currents of successively-varying frequency to the said motor equipment.

In witness whereof I have hereunto set my hand this 25th day of April, 1900.

WILLIAM B. POTTER.

Witnesses:
W. M. BROWN,
A. L. LONGEE.